United States Patent
Lalonde et al.

(10) Patent No.: US 9,639,773 B2
(45) Date of Patent: May 2, 2017

(54) PREDICTING A LIGHT PROBE FOR AN OUTDOOR IMAGE

(71) Applicant: Disney Enterprises, Inc., Burbank, CA (US)

(72) Inventors: Jean-Francois Lalonde, Pittsburgh, PA (US); Iain Matthews, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 178 days.

(21) Appl. No.: 14/091,270

(22) Filed: Nov. 26, 2013

(65) Prior Publication Data

US 2015/0146972 A1 May 28, 2015

(51) Int. Cl.
| | |
|---|---|
| G06K 9/62 | (2006.01) |
| G06K 9/46 | (2006.01) |
| G06K 9/00 | (2006.01) |
| G06T 15/50 | (2011.01) |

(52) U.S. Cl.
CPC ....... G06K 9/4661 (2013.01); G06K 9/00697 (2013.01); G06T 15/506 (2013.01)

(58) Field of Classification Search
None
See application file for complete search history.

(56) References Cited

U.S. PATENT DOCUMENTS

| | | | | |
|---|---|---|---|---|
| 8,416,240 B1* | 4/2013 | Kuffner, Jr. | ....... | G06F 17/30047 345/426 |
| 2001/0033639 A1* | 10/2001 | Martin | ................ | H04M 3/5307 379/88.14 |
| 2011/0055220 A1* | 3/2011 | Tyburski | ................ | G06Q 40/04 707/743 |
| 2013/0300899 A1* | 11/2013 | Tamura | ................ | H04N 5/2351 348/234 |
| 2014/0184496 A1* | 7/2014 | Gribetz | ................ | G02B 27/017 345/156 |

OTHER PUBLICATIONS

Shan et al—The visual Turing test for scene reconstruction—2013.*
Jessi Stumpfel; Direct HDR capture of the sun and sky;AFRIGRAPH '04 Proceedings of the 3rd international conference on Computer graphics, virtual reality, visualisation and interaction in Africa.*
P. Y. Laffont, A. Bousseau Coherent intrinsic images from photo collections. Siggraph Asia 2012, Oct. 2012.*

(Continued)

*Primary Examiner* — Iman K Kholdebarin
(74) *Attorney, Agent, or Firm* — Sheppard Mullin Richter & Hampton LLP (57) ABSTRACT

Methods and systems for predicting light probes for outdoor images are disclosed. A light probe database is created to learn a mapping from the outdoor image's features to predicted outdoor light probe illumination parameters. The database includes a plurality of images, image features for each of the plurality of images, and a captured light probe for each of the plurality of images. A light probe illumination model based on a sun model and sky model is fitted to the captured light probes. The light probe for the outdoor image may be predicted based on the database dataset and fitted light probe models.

24 Claims, 8 Drawing Sheets

(56) References Cited

OTHER PUBLICATIONS

Coombe et al—Capturng a surface light Fiield Under Virtual Illumination, Georgia Institute of Technology, Atlanta GA. The fourth international symposium on 3D data processing.—Jun. 2008.*
Lalonde et al—lighting estimation in outdoor image collections supplemet material—2013.*
Haber et al—Relighting objects from iamge collections—2009.*
Preetham et al—Apractical analytic model for daylight—1999.*
Adelson, E. H., and Pentland, A., The perception of shading and reflectance, Perception as Baysian Inference, 1996, 409-423, D. Knill and W. Richards, Eds.
Agarwal, S., Snavely, N., Simon, I., Seitz, S. M., and Szeliski, R., Building Rome in a day, IEEE International Conference on Computer Vision, 2009, 72-79.
Banerjee, A., Dhillon, I. S., Ghosh, J., and Sra, S., Clustering on the unit hypersphere using von mises-fisher distributions, Journal of Machine Learning Research, 2005, 1345-1382, 6.
Barron, J. T., and Malik, J., Color constancy, intrinsic images, and shape estimation, European Conference on Computer Vision, 2012.
Bitouk, D., Kumar, N., Dhillon, S., Belhumeur, P. N., and Nayar, S. K., Face swapping: automatically replacing faces in photographs, ACM Transactions on Graphics (SIGGRAPH 2008), 2008, 39:1-39:8, 27, 3.
Debevec, P., and Malik, J., Recovering high dynamic range radiance maps from photographs, Proceedings of ACM SIGGRAPH 1997, 1997.
Debevec, P., Rendering synthetic objects into real scenes: bridging traditional and image-based graphics with global illumination and high dynamic range photography, Proceedings of ACM SIGGRAPH 1998, 1998, 189-198.
Dhillon, I. S., and Modha, D. S., Concept decompositions for large sparse text data using clustering, Mach. Learn., 2001, 42, 1-2 (Jan.).
Diaz, M., and Sturm, P., Radiometric calibration using photo collections, IEEE International Conference on Computational Photography, 2011.
Frahm, J.-M., Georgel, P., Gallup, D., Johnson, T., Raguram, R., Wu, C., Jen, Y.-H., Dunn, E., Clipp, B., Lazebnik, S., and Polleyfeys, M., Building Rome on a cloudless day, European Conference on Computer Vision, 2010.
Furukawa, Y., and Ponce, J., Accurate, dense, and robust multi-view stereopsis, IEEE Transactions on Pattern Analysis and Machine Intelligence, 2012, 1362-1376, 32, 8 (Aug.).
Haber, T., Fuchs, C., Bekaert, P., Seidel, H.-P., Goesele, M., and Lensch, H. P. A., Relighting objects from image collections, In IEEE Conference on Computer Vision and Pattern Recognition, 2009.
Hoiem, D., Efros, A. A., and Hebert, M., Automatic photo pop-up, ACM Transactions on Graphics (SIGGRAPH 2005), 2005, 577-584, 24, 3 (Aug.).
Hoiem, D., Efros, A. A., and Hebert, M., Recovering surface layout from an image, International Journal of Computer Vision, 2007, 75, 1 (Oct.).
Hosek, L., and Wilkie, A., An analytic model for full spectral sky-dome radiance, ACM Transactions on Graphics (SIGGRAPH 2012), 2012, 31, 4, 95.
Karsch, K., Hedau, V., Forsyth, D., and Hoiem, D., Rendering synthetic objects into legacy photographs, ACM Transactions on Graphics (SIGGRAPH Asia 2011), 2011.
Karsch, K., Liu, C., and Kang, S. B., Depth extraction from video using non-parametric sampling, ECCV, 2012.
Ke, Y., Tang, X., and Jing, F., The design of high-level features for photo quality assessment, IEEE Conference on Computer Vision and Pattern Recognition, 2006.
Laffont, P.-Y., Bousseau, A., Paris, S., Durand, F., and Drettakis, G., Coherent intrinsic images from photo collections, ACM Transactions on Graphics (SIGGRAPH Asia 2012) (Oct.), 2012.
Lalonde, J.-F., Narasimhan, S. G., and Efros, A. A., What do the sun and the sky tell us about the camera?, International Journal of Computer Vision, 2010, 24-51, 88, 1 (May).
Lalonde, J.-F., Efros, A. A., and Narasimhan, S. G., Estimating the natural illumination conditions from a single outdoor image, International Journal of Computer Vision, 2012, 123-145, 98, 2 (Jun.).
Li, Y., Snavely, N., and Huttenlocker, D. P., Location recognition using prioritized feature matching, European Conference on Computer Vision, 2010.
Li, Y., Snavely, N., Huttenlocker, D. P., and Fua, P., Worldwide pose estimation using 3d point clouds, European Conference on Computer Vision, 2012.
Lombardi, S., and Nishino, K., Reflectance and natural illumination from a single image, European Conference on Computer Vision, 2012.
Lopez-Moreno, J., Hadap, S., Reinhard, E., and Gutierrez, D., Compositing images through light source detection, Computers & Graphics, 2010, 698-707, 34, 6.
Lopez-Moreno, J., Sundstedt, V., Sangorrin, F., and Gutierrez, D., Measuring the perception of light in consistencies, Symposium on Applied Perception in Graphics and Visualization, 2010.
Lowe, D. G., Distinctive image features from scale-invariant keypoints, International Journal of Computer Vision, 2004, 91-110, 60, 2.
Mury, A. A., Pont, S. C., and Koenderink, J. J., Structure of light fields in natural scenes, Applied optics, 2009, 5386, 48, 28.
Ng, R., Ramamoorthi, R., and Hanrahan, P., Triple product wavelet integrals for all-frequency relighting, ACM Transactions on Graphics (SIGGRAPH 2004), 2004, 477-487, 23, 3.
Oh, B. M., Chen, M., Dorsey, J., and Durand, F., Image-based modeling and photo editing, Proceedings of ACM SIGGRAPH 2001, 2001.
Panagopoulos, A., Samaras, D., and Paragios, N., Robust shadow and illumination estimation using a mixture model, IEEE Conference on Computer Vision and Pattern Recognition, 2009.
Panagopoulos, A., Wang, C., Samaras, D., and Paragios, N., Illumination estimation and cast shadow detection through a higher-order graphical model, IEEE Conference on Computer Vision and Pattern Recognition, 2011.
Perez, R., Seals, R., and Michalsky, J., All-weather model for sky luminance distribution—preliminary configuration and validation, Solar Energy, 1993, 235-245, 50, 3 (Mar.).
Pont, S. C., and Koenderink, J. J., Matching illumination of solid objects, Perception & Psychophysics, 2007, 459-468, 69, 3 (Apr.).
Preetham, A. J., Shirley, P., and Smits, B., A practical analytic model for daylight, Proceedings of ACM SIGGRAPH 1999, 1999.
Ray, S. F., The Manual of Photography: Photographic and Digital Imaging, 2000, 9 ed., Focal Press, Oxford.
Reda, I., and Andreas, A., Solar position algorithm for solar radiation applications, Tech. rep., Revised Jan. 2008.
Reinhard, E., Ward, G., Pattanaik, S., and Debevec, P., High dynamic range imaging, 2006, Morgan Kaufman.
Sato, I., Sato, Y., and Ikeuchi, K., Illumination from shadows, IEEE Transactions on Pattern Analysis and Machine Intelligence, 2003, 290-300, 25, 3 (Mar.).
Saxena, A., Sun, M., and Ng, A., Make3D: Learning 3D scene structure from a single still image, IEEE Transactions on Pattern Analysis and Machine Intelligence, 2008, 31, 5.
Snavely, N., Seitz, S. M., and Szeliski, R., Photo tourism: Exploring photo collections in 3D, ACM Transactions on Graphics (SIGGRAPH 2006), 2006, 25, 3.
Snavely, N., Scene reconstruction and visualization from internet photo collections: A survey, IPSJ Transactions on Computer Vision and Applications, 2011, 44-66, 3 (Sep.).
Stumpfel, J., Jones, A., Wenger, A., Tchou, C., Hawkins, T., and Debevec, P., Direct HDR capture of the sun and sky, In Proceedings of AFRIGRAPH, 2004.
Sun, M., Schindler, G., Turk, G., and Dellaert, F., Color matching and illumination estimation for urban scenes, IEEE International Workshop on 3-D Digital Imaging and Modeling, 2009.
Sunkavalli, K., Romeiro, F., Matusik, W., Zickler, T., and Pfister, H., What do color changes reveal about an outdoor scene?, IEEE Conference on Computer Vision and Pattern Recognition, 2008.

(56) References Cited

OTHER PUBLICATIONS

Yu, Y., and Malik, J., Recovering photometric properties of architectural scenes from photographs, Proceedings of ACM SIGGRAPH 1998, 1998.
Zheng, Y., Chen, X., Cheng, M.-M., Zhou, K., Hu, S.-M., and Mitra, N. J., Interactive images: Cuboid proxies for smart image manipulation, Oct. 2012.
Zotti, G., Wilkie, A., and Purgathofer, W., A critical review of the preetham skylight model, 15th International Conference in Central Europe on Computer Graphics, Visualization and Computer Vision, 2007.
Lalonde, J-F., Matthews, I., Predicting Outdoor Light Probes from a Single Photograph, SIGGRAPH 2013, 2013.

\* cited by examiner

PREDICTING A LIGHT PROBE FOR AN OUTDOOR IMAGE

TECHNICAL FIELD

The present disclosure relates generally to light probes, and more particularly, some embodiments relate to systems and methods for predicting light probes for outdoor images.

DESCRIPTION OF THE RELATED ART

Image-based lighting technology is a key component of creating photorealistic computer-generated content. Movie special effects shots, for example, often contain several virtual objects that are inserted and relighted into the movie after the movie was filmed. Current methods of realistically illuminating these special effects objects require direct capture of the illumination conditions of the scene in which the virtual object is inserted. This requires careful planning, precise image data handling techniques, and cannot be applied to photographs for scenes whose illumination conditions were not captured. Application of such photorealistic lighting techniques is monetarily and temporally expensive. Accordingly, methods of accurately predicting the lighting conditions of an image are desirable.

BRIEF SUMMARY OF THE DISCLOSURE

According to various embodiments of the disclosed methods and systems, light probes are predicted for outdoor images based on a learned mapping from the outdoor image's features to light probe illumination parameters. The outdoor image's features may include features computed from a surface normal. In one embodiment, the learned mapping is based on a light probe database that includes a plurality of images, image features for each of the plurality of images, and a captured light probe for each of the plurality of images.

In one particular embodiment, the learned mapping is based on a sun model for sun parameters and a sky model for sky parameters. In this embodiment, the light probe illumination parameters comprise the sun parameters and the sky parameters. The sun parameters may comprise sun position, sun angular variation, and sun color. The sky parameters may comprise sky color, sky angular variation, and sky turbidity.

In one embodiment, the sun model is based on a double-exponential model and the sky model is based on a Preetham model. In other embodiments, the sun model may be based on a von-Mises Fisher model, and the sky model may be based on a cosine model or a von-Mises Fisher model. In yet other embodiments, any combination of sun model and sky model may be used. The sun model and sky model are fitted to the light probe database captured light probes to create fitted models.

In further embodiments, a light probe is predicted by predicting the sun position based on a probabilistic model and predicting the sky parameters and other sun parameters using a regression technique. This light probe prediction process uses the fitted models. In yet further embodiments, a virtual object is inserted into the outdoor image and lighted using the predicted light probe.

Other features and aspects of the disclosed method and system will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

DETAILED DESCRIPTION

Figure 1A:
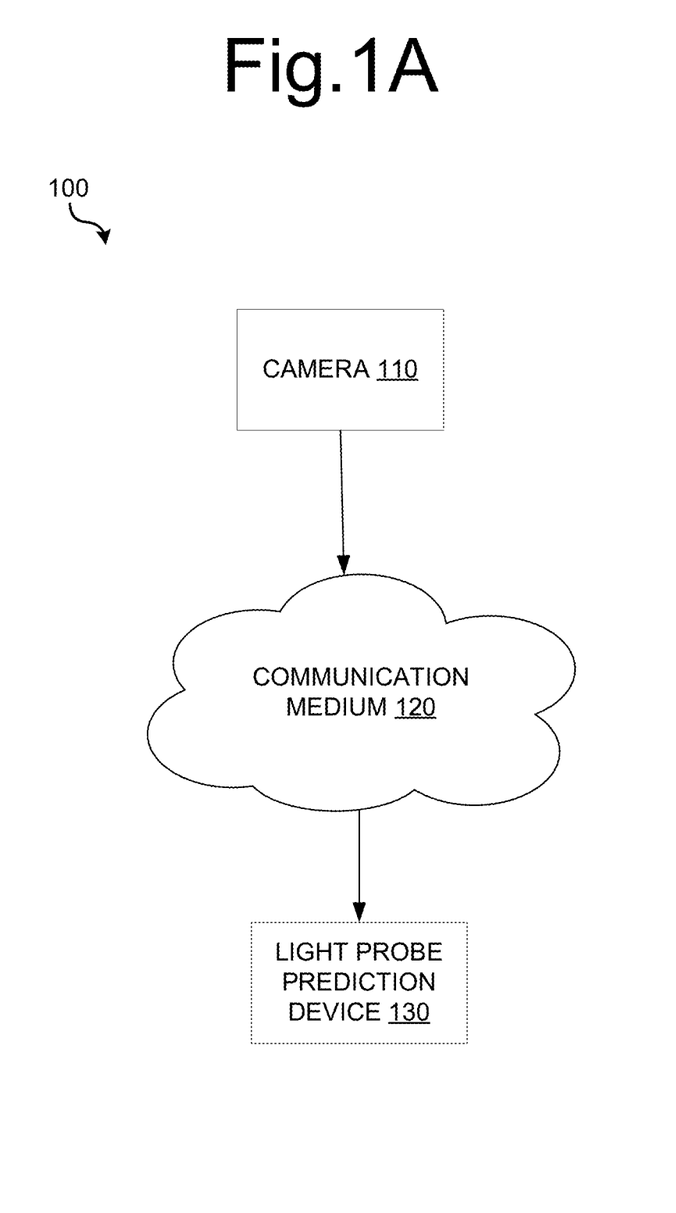
FIG. 1A illustrates a communications environment in accordance with the present disclosure.

FIG. 1A illustrates a communications environment for light probe prediction in accordance with the present disclosure. In communications environment 100, camera 110 captures a photograph of a scene that is then transmitted to light probe prediction device 130 over communication medium 120. Light probe prediction device 130 may comprise any computing device (tablets, PDA's, smartphones, cellphones, palmtops, laptops, etc.), workstations or servers, or any other type of general-purpose computing device configured to receive captured photographs and predict the light probe for the scene (i.e. the scene's illuminations conditions) based on the captured photograph's properties. Light probe prediction device 130 may use the predicted light probe to relight a virtual object (e.g. a character, an animal, a building, a tree, etc.) into the photographed scene. In one embodiment, camera 110 may comprise a video recording device that captures a plurality of images (frames). In this embodiment, light probe prediction device 130 may predict a light probe for each of the plurality of frames to relight a virtual object into the video.

Communication medium 120 may comprise a communications network such as a cellular telephone network, a local area network (LAN), a wireless LAN (WLAN), a wide area network (WAN), a personal area network (PAN), a portion of the Internet, or any combination thereof. The medium 120 may be a wireless network system such as a cellular network, a wireless personal area network, a wireless local area network, a Bluetooth system, or other similar communication medium. The medium alternatively may be a wired system, such as a coaxial cable system, a fiber optic cable system, an Ethernet cable system, a USB system, or other similar communication medium.

Light probe prediction device 130 may be implemented in any environment where the realistic relighting of virtual objects into outdoor photographs is desired. In one embodiment, the environment does not require real-time light probe prediction. For example, light probe prediction device 130 may be used in a movie post-filming process to relight virtual objects such as special effects or CGI characters into filmed movie frames. As another example, light probe prediction device 130 may be used in the design of video games to dynamically insert virtual video game characters or objects into photographs or video. In another embodiment, the environment is a dynamic environment that requires immediate insertion of a virtual object into images. For example, the environment may comprise a theme park where camera 110 photographs theme park attendees and light probe prediction device 130 immediately thereafter inserts and relights a virtual object into the photograph. In this embodiment, camera 110 and light probe device 130 may be integrated into one module.

Figure 1B:
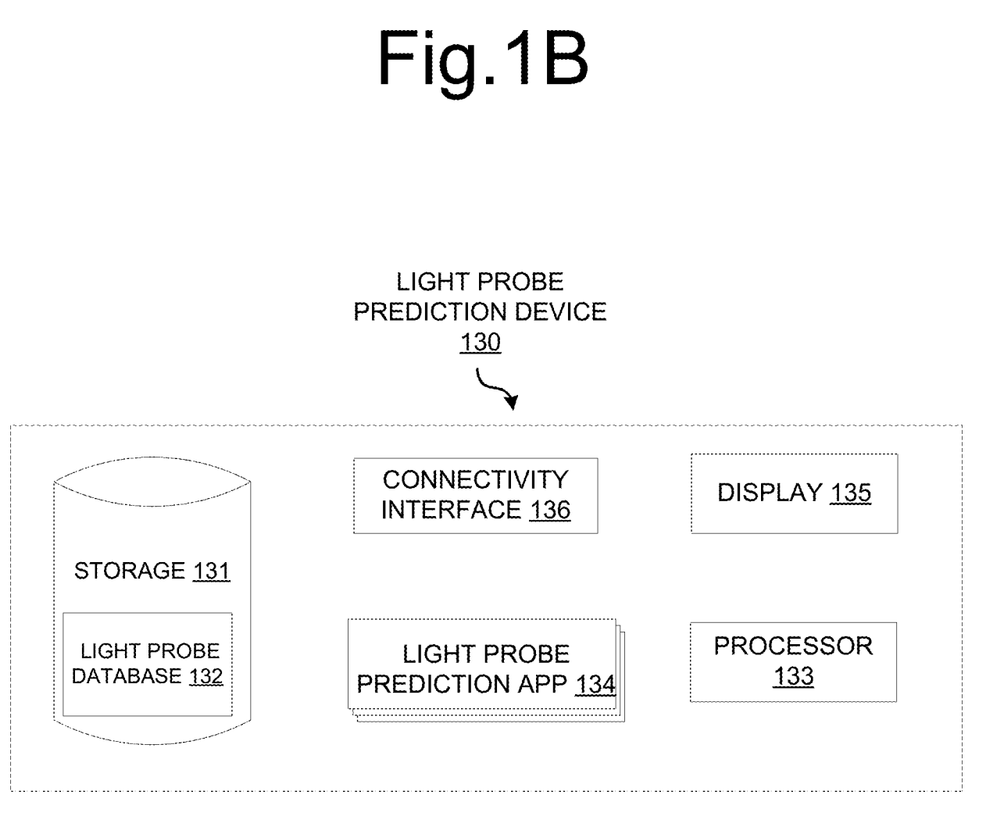
FIG. 1B illustrates a high-level block diagram of a light probe prediction device.

FIG. 1B is a high-level block diagram of a light probe prediction device 130 that may be used in accordance with the described system. Light probe prediction device 130 may comprise a storage 131 configured to store a captured light probe database 132, processor 133, light probe prediction application 134, display 135, and connectivity interface 136 for connecting to camera 110 through communication medium 120.

Display 135 may be configured to display a photograph or video that was relighted with a virtual object using light probe prediction application 134. Alternatively, display 134 may be configured as a peripheral for an operator of light probe prediction device 130 to interact with light probe prediction application 134 through a user interface (not shown).

Light probe prediction device 130 implements a light probe prediction application 134 for predicting the light probe of an outdoor image or photograph for subsequently inserting a virtual object into the image and relighting it. Light probe prediction application 134 may be integrated as part of an animation application, a movie editing application, an image editing application, a video game design application, or some combination thereof. Light probe prediction application is used in conjunction with light probe database 132 (described below) to provide a system and method for predicting the lighting conditions of an outdoor image so that a virtual object may be inserted and relighted in the image. As illustrated in FIG. 1B, Light probe database 132 is integrated with light probe prediction device 130. In another embodiment, light probe database 132 is accessible by light probe prediction device 130 over a communications interface.

Figure 2A:
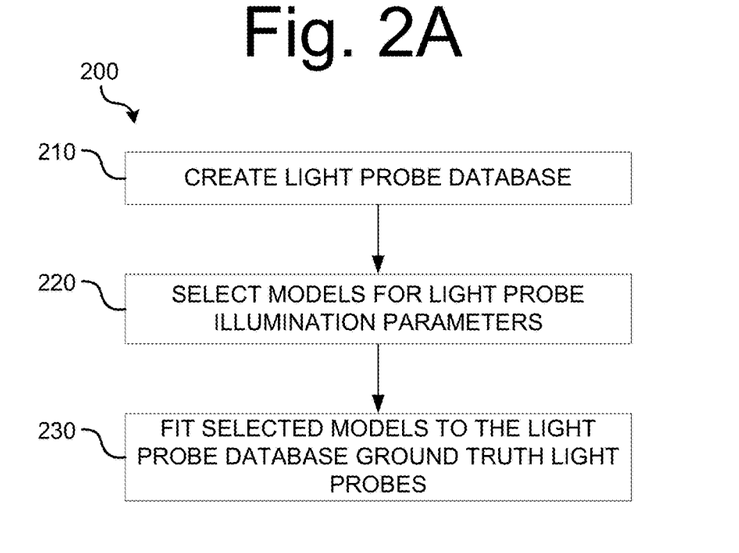
FIG. 2A is an operational flow diagram illustrating an example process for creating fitting models for light probe illumination parameters based on a created light probe database. The fitted models may be used in a light probe prediction process.
Figure 2B:
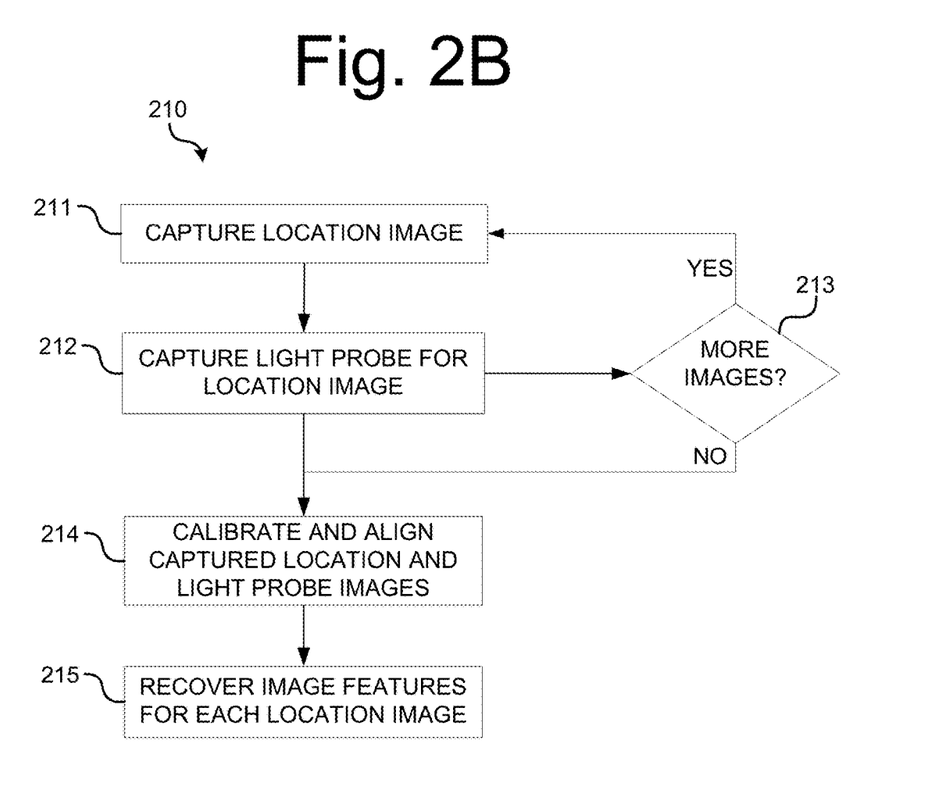
FIG. 2B is an operational flow diagram illustrating an example process for creating a light probe database that may be used in the process of FIG. 2A.

FIG. 2A is an operational flow diagram illustrating an example process for creating fitting models for light probe illumination parameters based on a created light probe database. The fitted models may subsequently be used in a mapping for predicting an image's light probe based on the image's features. At operation 210, a light probe database is created. FIG. 2B is an operational flow diagram illustrating an example process 210 for creating a light probe database that may be used in process 200. Process 210 creates a light probe database 132 that may be used in a light probe prediction process. As will be further described below, the light probe database comprises a plurality of outdoor photographs or images, image features for each of the plurality of photographs, and a plurality of captured light probes associated with the plurality of photographs. The photographed locations are captured under a plurality of illumination conditions.

With reference now to process 210, at operation 211 a camera captures a location image for an outdoor scene. The image may be captured at approximately eye level or another perspective that facilitates relative alignment of the image and associated light probe. A single operation 211 may comprise taking one image or a plurality of images for the outdoor scene at a particular time. The captured outdoor scene may be selected based on desired parameters that improve the accuracy of the mapping. In one embodiment, for example, the desired parameters comprise the presence of man-made structures (e.g. buildings) with relatively planar surfaces and relatively few non-lambertian structures. In another embodiment, the desired parameters may vary based on the expected parameters of the photograph with unobserved illumination conditions for which a light probe is predicted. In another embodiment, the desired parameters may vary based on the desired scope of applicability of the mapping (e.g. how much it can be generalized while maintaining a threshold predictive accuracy).

At operation 212, a ground truth light probe is captured for one or more location images. In one particular implementation, the light probe is captured by pointing a camera at the sky in the direction opposite the captured scene and taking one or more photographs (e.g. 9 exposures in burst mode). In an alternative implementation, a camera may be installed at a high vantage point (e.g. a roof of a nearby tall building), and multiple exposures of the light probe may be captured. If multiple exposure images are captured, they may be combined to create a single high-dynamic-range (HDR) representation of the light probe. The camera used to capture the light probe may comprise a wide-angle fisheye lens or other lens configured to take wide-angle photographs. In one embodiment, the camera lens is calibrated such that the light probe can be mapped to an angular environment map representation. If more images are required for the light probe database (decision 213), operations 211 and 212 are repeated. The desired size of the light probe database may depend on the number of different scenes captured, the number of different illumination conditions captured, and the desired accuracy of the mapping.

In exemplary method 210, operation 212 is performed immediately after operation 211 to associate the captured light probe to the captured location image. In some embodiments, a plurality of captured location images may be associated with one captured light probe. Each operation may be performed with the same camera or a different camera. If the operations are performed with different cameras, the camera clocks and white balance settings may be synchronized prior to beginning process 210.

At operation 214, the captured location images and light probe images are calibrated and aligned. For example, in one embodiment the light probes are aligned by aligning the exposures of the skies, correcting for camera displacements, and rotating the light probe to match the sun position and orientation. In another embodiment, all of the captured location images and light probes are intensity-normalized on the same relative exposure based on their exposure value.

Image features are then recovered for each location image at operation 215. Image features may comprise any features that may be used to determine outdoor lighting conditions and direction. For example, image features may comprise the brightest and darkest regions of a structure in the image, shadows and their relative depth, and surface normals of a structure in the image. In one embodiment, recovery of image features for each location image may comprise recovering a normal map for each location image. In one embodiment, a normal map is recovered by reconstructing the image in three dimensions and aligning the image with the camera. In one embodiment, the location image is reconstructed in three dimensions using structure from motion. In this embodiment, only the objects of interest (e.g. man-made lambertian structures) are modeled in three dimensions and other potential blockers that might cast shadows on the object of interest are ignored. In an alternative embodiment, potential blockers may be considered. In an alternative embodiment, an existing manmade three-dimensional model of the object of interest is aligned to the image data. In this embodiment, a normal map is recovered by back projecting each surface normal of the three dimensional model into the image. In one embodiment, recovery of the normal map further comprises aligning the reference frame of the object of interest with the world reference frame.

Figure 3:
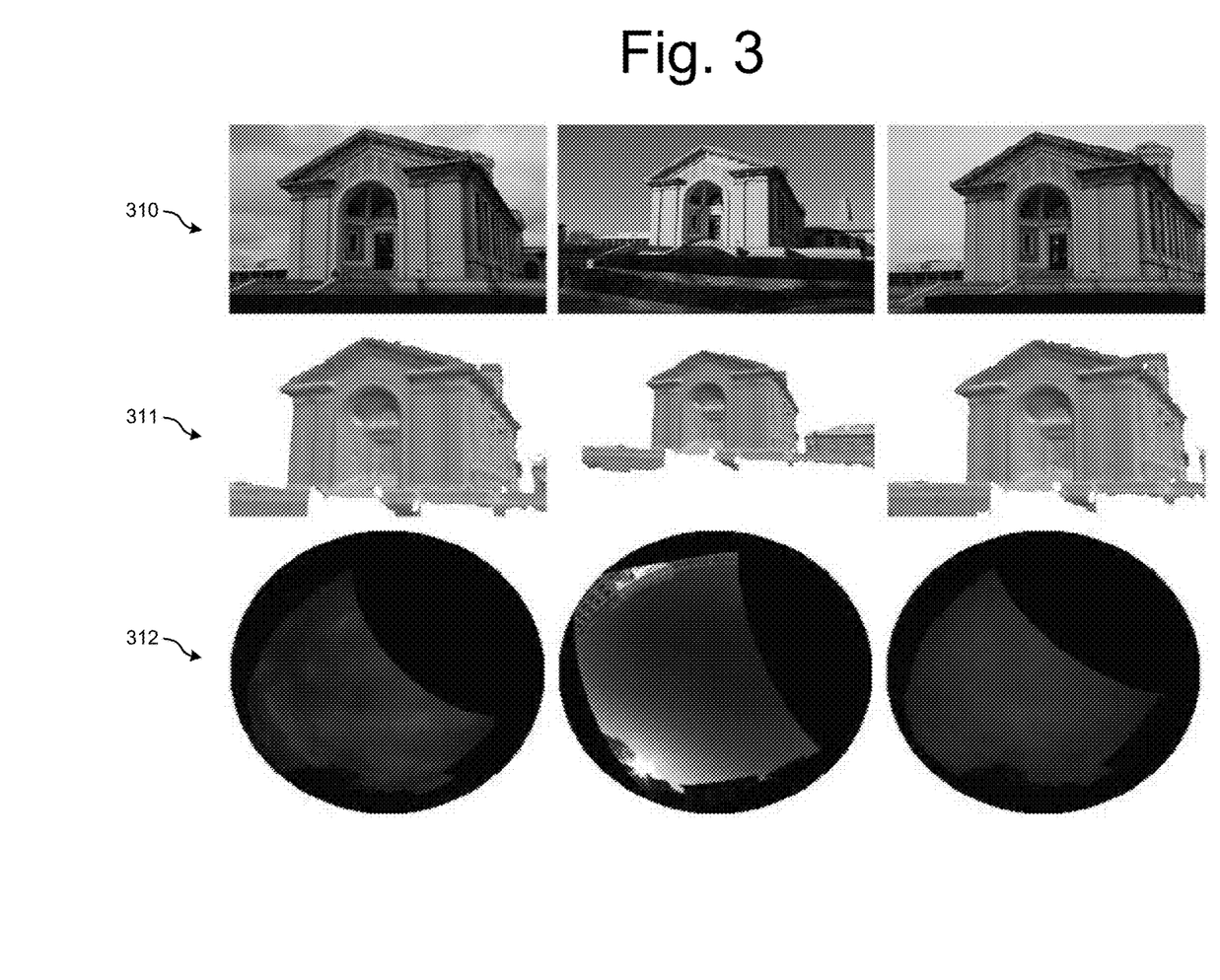
FIG. 3 illustrates an example set of light probe data for one scene that may be used in a light probe database.

After completion of process 210, a light probe database dataset has been gathered. The dataset comprises images, the light probes associated with the images, and the image features of the images. FIG. 3 illustrates an exemplary subset of data for a light probe database. The exemplary data comprises three images 310 for a location, the normal maps 311 associated with each of the images, and the light probes 312 associated with each of the images. The illustrated images are geometrically and radiometrically calibrated. With the light probe database created, light probe illumination models may be selected for modeling the illumination parameters of a predicted light probe.

Referring now back to process 200, at operation 220 models are selected for modeling the illumination parameters of a light probe. In exemplary process 200, the models are based on a sun model and a sky model for describing the outdoor illumination parameters. The selected sun and sky models provide the benefit of providing low-dimensional models that accurately capture the main sources of light variations in the sky with few parameters. This saves computational resources by simplifying the task of predicting light probes to predicting the values of the model parameters.

In alternative embodiments, the models may be based on other outdoor light sources such as, for example, a moon model or an artificial light model. In these alternative embodiments, the light probe database may comprise a different set of images (e.g. nighttime images with the moon).

In the illustrated embodiment, the sun and sky are modeled separately. In alternative embodiments, the sun and sky are modeled together. With reference now to the sun model, the sun model comprises a plurality of illumination parameters for modeling the lighting of the sun. For example, the sun model may comprise the illumination parameters of sun position or direction, sun angular variation or spatial variation, and/or sun color. Each illumination parameter comprises one or more dimensions. For example, sun color may be modeled in three dimensions using an RGB color representation. In one embodiment, the sun may be modeled with a von-Mises Fisher (vMF) distribution as described in A. Banerjee, I. S. Dhillon, J. Ghosh, and S. Sra. *Clustering on the unit hypersphere using von mises-fisher distributions*. Journal of Machine Learning Research, 6:1345-1382, 2005. In this embodiment, the vMF distribution is used to model the intensity of the sun's light direction in an RGB color channel as a function of the direction, color, and diffuseness of the sun. In an alternative embodiment, the sun may be modeled with a double-exponential distribution. In one example mathematical implementation of the double-exponential distribution, the sun model may be defined by Equation (1):

$$f_{sun} = e^{ge^{-k/\gamma}} \quad (1)$$

Where g controls the width of the curve for low intensities (i.e. the shape of scattering close to the sun), k controls the width of the curve at high intensities (i.e. the shape of the sun), and $\gamma$ is the angular difference between the sun center and the light direction. In other embodiments, other sun models may be used.

The sky model similarly comprises a plurality of illumination parameters of one or more dimensions for modeling the lighting of the sky. For example, the sky model may comprise the illumination parameters of sky color, sky angular variation, sky turbidity, and/or the zenith angle of light direction. In one embodiment, the sky may be modeled using the vMF distribution in a similar manner to that described above. In an alternative embodiment, the sky may be modeled using a Preetham model as described in A. J. Preetham, P. Shirley, and B. Smits. *A practical analytic model* 842 for daylight. In SIGGRAPH, August 1999. In yet another embodiment, the sky may be modeled using the classic non-uniform sky model (cosine model) described in P. Moon and D. E. Spencer. *Illumination from a non-uniform sky*. 826 Transactions of the Illumination Engineering Society, 37, 1942, which may be used to represent the sky variation using a weighted cosine term. In other embodiments, other sky models may be used.

Figure 4:
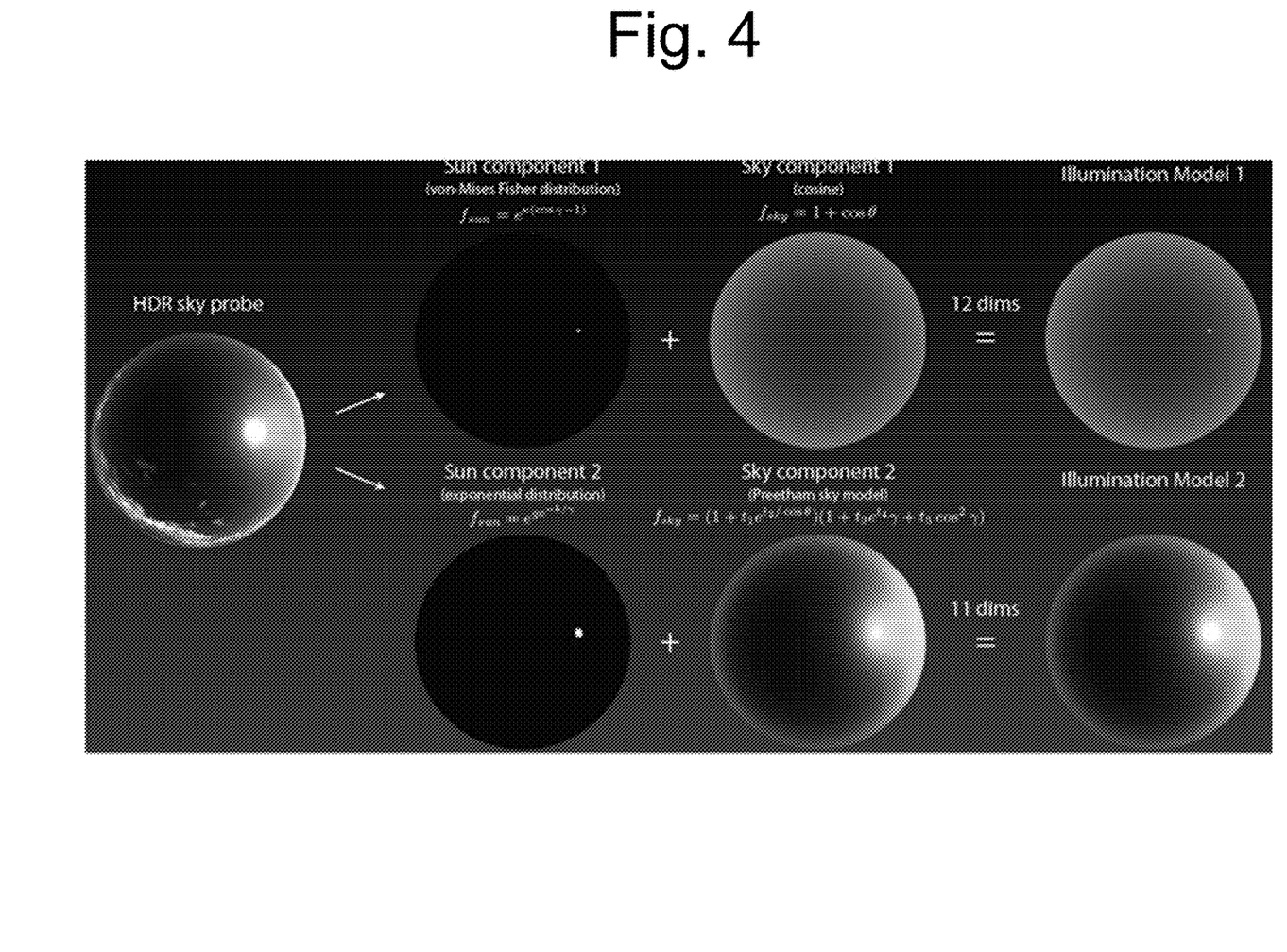
FIG. 4 illustrates two example sun and sky model combinations that may be used as a model for light probe illumination conditions for an outdoor image.

The selected sun and sky models may be combined in any arrangement. The selection of the models may depend on the expected image and illumination conditions of the photograph for which a light probe is being predicted (e.g. overcast or clear skies) and/or the desired predictive accuracy of the model (i.e. "fit") versus computational complexity. FIG. 4 illustrates two example illumination models that use different sun and sky models. Illumination model 1 has 12 dimensions: 2 for sun position, 1 for sun concentration, 3 for sun color, 3 for sky color, and 3 for the sky costine term. Model 1 uses a vMF distribution for modeling the sun and a cosine model for modeling the sky. Illumination model 2 has 11 dimensions: 2 for the sun position, 2 for the sun concentration, 3 for the sun color, 3 for the sky color, and 1 for the sky turbidity. Model 2 uses a double-exponential distribution for modeling the sun and a Preetham model for modeling the sky.

Following the selection of a sun and sky model for modeling the illumination parameters of a light probe, at operation 230 the selected sun model and sky model are fitted to the light probe database ground truth light probes. In one embodiment, the sun and sky models may be fitted to the ground truth light probes by applying a non-linear least-squares fitting method. In this embodiment, the fitting method may further comprise fitting parameters to ranges that avoid ambiguities in explaining the causes of a sky's appearance. For example, the parameter fitting range may be chosen such that the fitted model always predicts the most probable cause (i.e. composition of sun and sky) of particular illumination conditions. Alternatively, the fitted model may be chosen based on the expected cause of the illumination conditions of the outdoor images for which the light probes are predicted. With the light probe database and fitted models, a light probe may then be predicted for an outdoor image of a scene.

Figure 5:
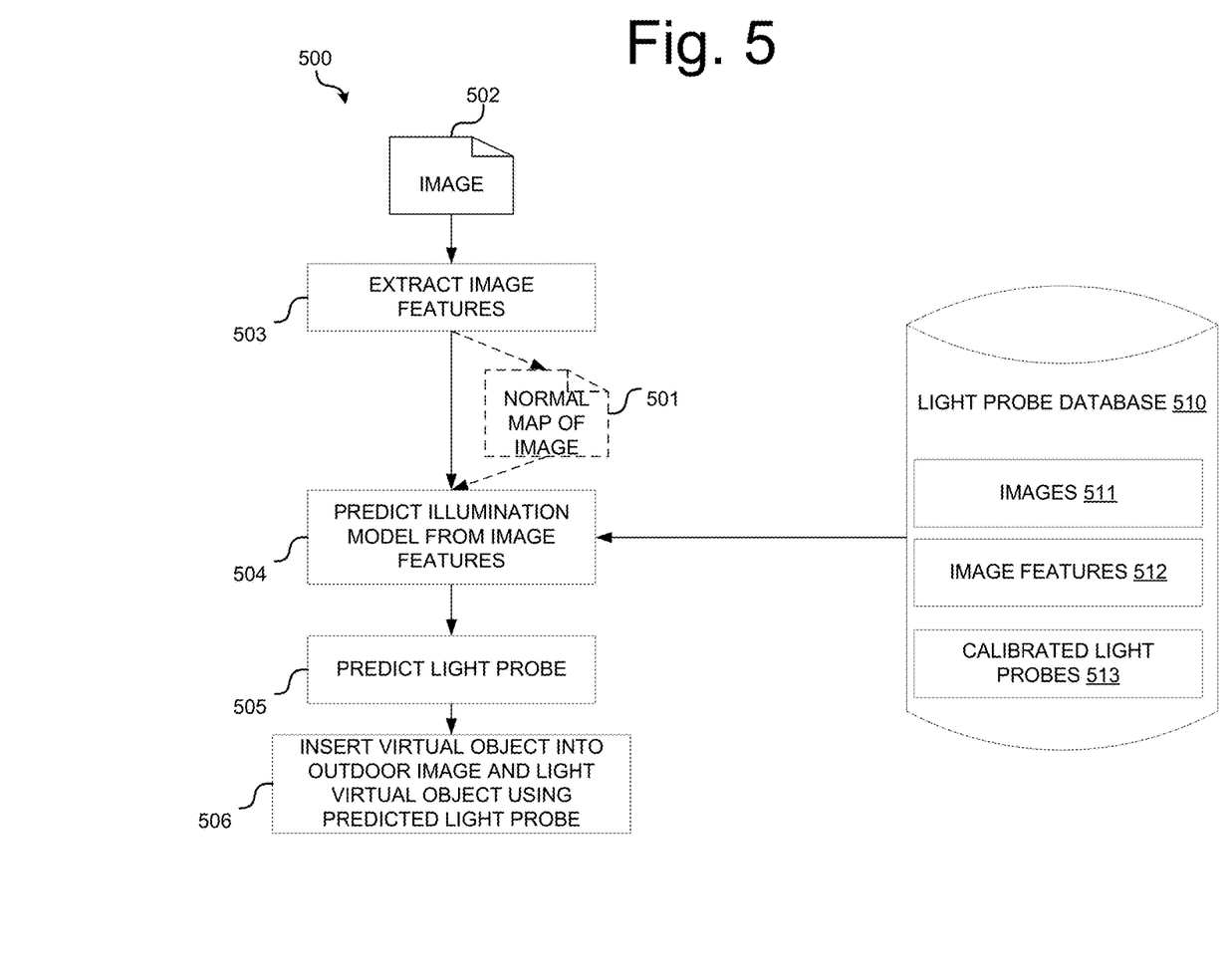
FIG. 5 is an operational flow diagram illustrating an example process for predicting a light probe for an outdoor image based on a learned mapping from the outdoor image's features to light probe illumination parameters.

FIG. 5 is an operational flow diagram illustrating an example process 500 for predicting a light probe for an outdoor image 502 (e.g. photograph or video frames) based on a learned mapping from the outdoor image's features to light probe illumination parameters. In exemplary process 500, the lighting conditions for image 502 have not been directly captured. As further described below, process 500 predicts the light probe for image 502 using only the image features of image 502, for example, a normal map 501 of image 502. The light probe illumination parameters may be predicted independently of each other, in a plurality of groups, or together in one group. The learned mapping relies on models fitted to a previously created light probe database 510, which comprises a plurality of images 511, image features 512 associated with each of the plurality of images 511, and a plurality of calibrated light probes 513 associated with images 511. In some embodiments, images 511, image features 512, and calibrated light probes 513 may be distributed over multiple databases. Image features 512, may include, for example, brightest and darkest regions of a structure in the images, shadows and their relative depth, and surface normals of a structure in the image (e.g. recovered from a normal map of the image).

At operation 503, image features are extracted from image 502. In one exemplary embodiment, the image features extracted from image 502 are the same as the image features 512 previously extracted from images 511. Extracting the same features from image 502 enables a subsequent regression (described below) of those features onto database 510, where they were previously computed for other images 511. In one embodiment, a normal map 501 is extracted from image 502. Normal map 501 may comprise a plurality of surface normals of a structure or other object present in image 502.

At operation 504, an illumination model with illumination parameters is predicted for image 502 based on the extracted image features. The predicted illumination model relies on models previously fitted to light probe database 510. In one exemplary embodiment, the illumination model is based on a sun model and a sky model respectively comprising sun parameters (e.g. sun position/direction, sun angular variation or spatial variation, sun color, etc.) and sky parameters (e.g. sky color, sky angular variation, sky turbidity, zenith angle of light direction, etc.)

In one embodiment, the sun direction is predicted independently of the other illumination parameters of the illumination model. In this embodiment, the sun direction is predicted using a mapping from outdoor image 502 and its normal map 501 to the sun direction. In a particular implementation of this embodiment, it is assumed that each of image 502 and a subset or all of images 511 comprise an object that is composed of at least two approximately planar surfaces, each surface is mainly lambertian (e.g. non-lambertian materials such as windows, if any, are sparse), and the surfaces possess a similar distribution of materials. In this embodiment, the surfaces may or may not have a similar distribution of materials across different images. A probabilistic model may use the ratios of irradiance (intensity) of two planar surfaces with different intensities to predict the most likely light direction given image 502 and its geometry. The probabilistic model samples the entire space or a subspace of the possible sun positions based on fitted light probe database 510 and determines the probability that each sun position gives the appearance of the scene based on the planar surfaces (i.e. surface normal). In one embodiment, the possible sun positions are weighted according to their likelihood given fitted light probe database 510. The probabilistic model of this ratio and the fitted data of light probe database 510 are used to account for unknown variables. In an alternative embodiment, the sun direction may be independently predicted from other illumination parameters using the known geometry of the outdoor scene (e.g. ground plane and nearby occluders that generate cast shadows).

In an alternative embodiment, the sun position may be predicted jointly with the other illumination parameters. In this embodiment, the light probe database 510 is used to impose constraints on the illumination parameters (i.e. determine what typical illumination parameters look like). In one embodiment, joint prediction is performed using only the known material properties (albedo) of the surfaces of the scene of image 502. In an alternative embodiment, joint prediction is performed using both the known material properties of the surfaces of the scene, and the known geometry of the outdoor scene of image 502 (e.g. ground plane and nearby occluders that generate cast shadows). The sun position may be predicted relative to the camera or another reference point.

In one embodiment, illumination parameters other than sun position (e.g. sun angular variation, sun color, sky color, etc.) may be predicted using a regression technique. In one embodiment, a kernel regression function is used to learn a mapping from the image features of outdoor image 502 to illumination parameters. Image features for the kernel regression may be selected based on their scene independence and ability to retain important illumination information. The mapping parameters are learned using the dataset of the light probe database 510. In one alternative embodiment, the sun position may also be predicted using a kernel regression technique. In other embodiments, other regressions techniques such as a linear regression may be used.

Once the illumination model with corresponding illumination parameters is predicted for image 502, at operation 505 a light probe is predicted for image 502. Given a predicted illumination model with known illumination parameters, the illumination color for any given light direction may be obtained by evaluating the model with those parameters at the given light direction. In one embodiment, the predicted light probe is generated by sampling a plurality of light directions spanning the sky hemisphere, and evaluating the predicted illumination model at each of the plurality of directions using the illumination parameters to obtain light colors for each of the plurality of directions.

Figure 6:
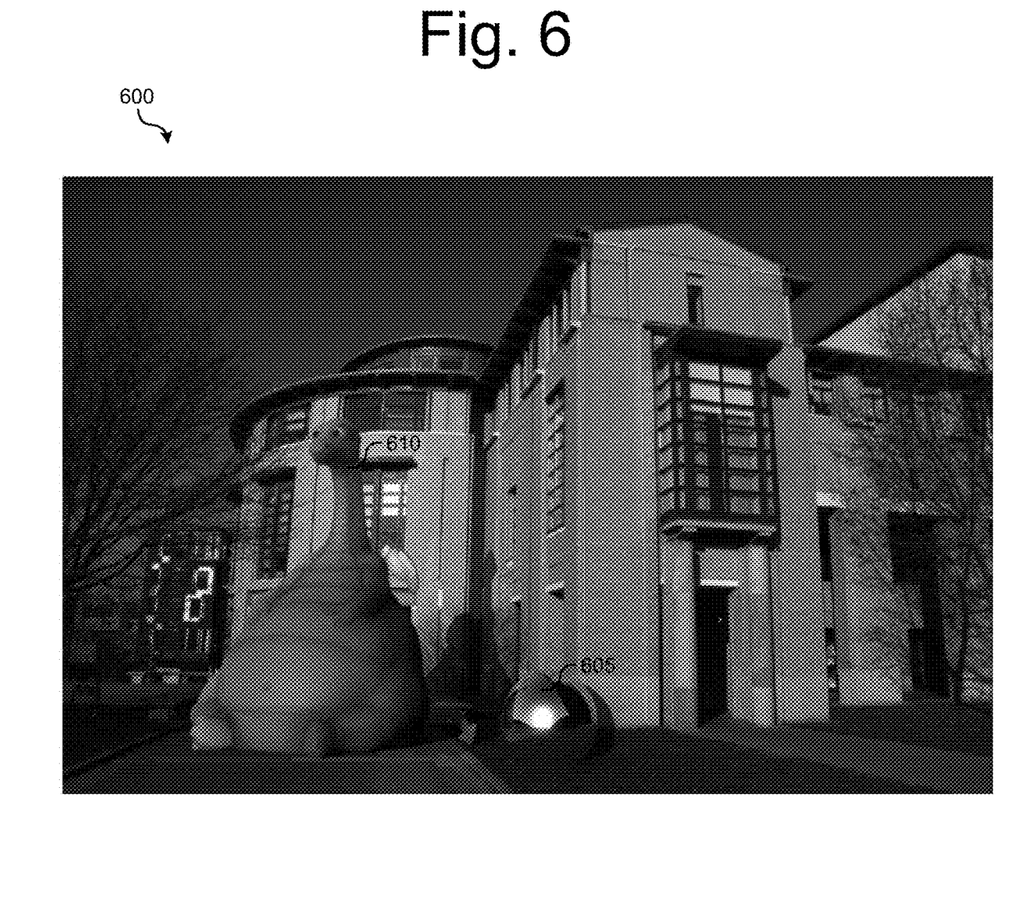
FIG. 6 illustrates an example image that uses a predicted light probe to light an inserted virtual object.

Once a light probe is predicted for outdoor image 502, at operation 506 a virtual object is inserted into the outdoor image and lighted using the predicted light probe. In one embodiment, the image is lighted using the image based lighting pipeline. In some embodiments, additional techniques may be used to model nearby geometry that may not be considered by the described method 500. FIG. 6 illustrates an example outdoor image 600 with predicted light probe 605 and inserted and lighted virtual object 610.

In one embodiment, light probe prediction process 500 may be used to dynamically model the lighting conditions of a video comprising a plurality of image frames. In this embodiment, the temporal movements of the image frame are incorporated in the light probe prediction model's parameters. The predicted light probe may be temporally updated based on a predefined frequency, sudden changes in the lighting conditions of the image scene, movements away from the image scene, the introduction of objects or occluders into the image scene, or some combination thereof. For example, in videos where the image frame remains relatively static over time, the light probe predicted for one image frame may be reused for subsequent image frames, assuming the lighting conditions of the scene do not suddenly change. In one implementation of this embodiment, temporal smoothness (across frames) is imposed as a condition of the model.

Figure 7:
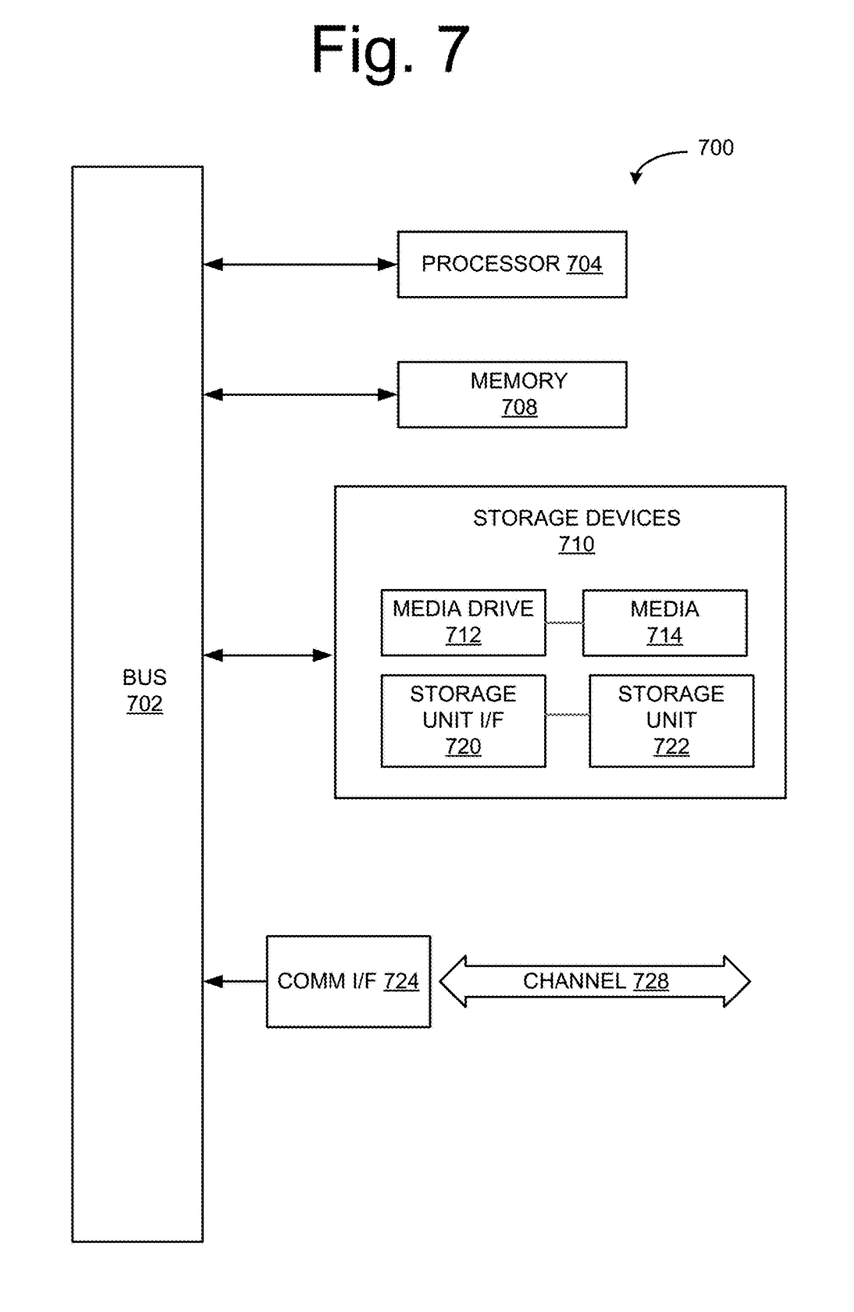
FIG. 7 illustrates an example computing module that may be used to implement various features of the systems and methods disclosed herein.

FIG. 7 illustrates an example computing module that may be used to implement various features of the systems and methods disclosed herein. As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a CD or DVD drive (R or RW), or other removable or fixed media drive might be provided. Accordingly, storage media 714 might include, for example, a hard disk, a solid state drive, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   predicting a light probe for an outdoor image based on a learned mapping from the outdoor image's features to light probe illumination parameters;
   wherein the light probe illumination parameters comprise sun parameters and sky parameters;
   wherein the learned mapping is based on a light probe database and a double exponential sun model or von-Mises Fisher sun model for the sun parameters and a sky model for the sky parameters, and wherein the light probe database comprises:
   a plurality of images comprising a plurality of objects at a plurality of different locations captured under a plurality of illumination conditions;
   image features for each of the plurality of images; and
   a plurality of captured light probes associated with the plurality of images.

2. The method of claim 1, wherein the outdoor image's features comprise features computed from a surface normal.

3. The method of claim 2, wherein image features for each of the plurality of images in the light probe database comprise a normal map.

4. The method of claim 1, wherein the sun parameters comprise sun position, sun angular variation, and sun color.

5. The method of claim 1, wherein the sky model is based on one of a Preetham model, a cosine model, or a von-Mises Fisher model.

6. The method of claim 1, wherein the sun model and the sky model are fitted to the light probe database captured light probes to create fitted models.

7. The method of claim 1, further comprising inserting a virtual object into the outdoor image and lighting the virtual object using the predicted light probe.

8. The method of claim 4, wherein the sky parameters comprise sky color and sky angular variation.

9. A method, comprising:
   predicting a light probe for an outdoor image based on a learned mapping from the outdoor image's features to light probe illumination parameters;
   wherein the light probe illumination parameters comprise sun parameters and sky parameters, wherein the sun parameters comprise sun position, sun angular variation, and sun color, wherein the sky parameters comprise sky color and sky angular variation;
   wherein the learned mapping is based on a sun model for the sun parameters and a sky model for the sky parameters;
   wherein the learned mapping is based on a light probe database comprising:
   a plurality of images comprising a plurality of locations captured under a plurality of illumination conditions;
   image features for each of the plurality of images; and
   a plurality of captured light probes associated with the plurality of images; and wherein predicting a light probe for an outdoor image comprises:
   predicting the sun position based on a probabilistic model; and
   predicting the sun angular variation, sun colors, sky colors, and sky angular variation based on a regression technique.

10. The method of claim 9, wherein the sun position is predicted relative to the camera that took the outdoor image.

11. The method of claim 9, wherein the regression technique is a kernel regression or a linear regression.

12. A system, comprising:
    a camera configured to take an outdoor image; and
    a computer configured to predict a light probe for the outdoor image based on a learned mapping from the outdoor image's features to light probe illumination parameters:
    wherein the light probe illumination parameters comprise sun parameters and sky parameters;
    wherein the learned mapping is based on a light probe database and a double exponential sun model or von-Mises Fisher sun model for the sun parameters and a sky model from the sky parameters, and wherein the light probe database comprises:
    a plurality of images comprising a plurality of objects at a plurality of different locations captured under a plurality of illumination conditions;
    image features for each of the plurality of images; and
    a plurality of captured light probes associated with the plurality of images.

13. The system of claim 12, wherein the outdoor image's features comprises features computed from a surface normal.

14. The system of claim 13, wherein image features for each of the plurality of images in the light probe database comprise a normal map.

15. The system of claim 12, wherein the sun parameters comprise sun position; sun angular variation, and sun color.

16. The system of claim 12, wherein the sky model is based on one of a Preetham model, a cosine model, or a von-Mises Fisher model.

17. The system of claim 12, wherein the sun model and the sky model are fitted to the light probe database captured light probes to create fitted models.

18. The system of claim 12, wherein the computer is further configured to: insert a virtual object into the outdoor image; and
    light the virtual object using the predicted light probe.

19. The system of claim 15, wherein the sky parameters comprise sky color and sky angular variation.

20. The system of claim 19, wherein predicting a light probe for an outdoor image comprises:
    predicting the sun position based on a probabilistic model; and
    predicting the sun angular variation, sun colors, sky colors, and sky angular variation based on a regression technique.

21. The system of claim 20, wherein the sun position is predicted relative to the camera that took the outdoor image.

22. The system of claim 20, wherein the regression technique is a kernel regression or a linear regression.

23. A method of creating a light probe database, comprising:
    capturing, with a camera, a plurality of images of a plurality of objects at plurality of different locations under a plurality of illumination conditions;
    capturing, with a camera, a light probe for each of the plurality of images;

recovering image features for each of the plurality of captured images; wherein recovering image features for each of the plurality of captured images comprises recovering a normal map for each of the plurality of captured images; and calibrating and aligning the captured images and captured light probes.

24. The method of claim 23, wherein the light probe database is used to predict a light probe for an outdoor image.

* * * * *